United States Patent [19]

Nakagawa et al.

[11] Patent Number: 5,060,616
[45] Date of Patent: Oct. 29, 1991

[54] INTAKE SYSTEM FOR MULTIPLE-VALVE ENGINE

[75] Inventors: Tadashi Nakagawa; Youichi Kuji; Kenji Kashiyama, all of Hiroshima, Japan

[73] Assignee: Mazda Motor Corporation, Japan

[21] Appl. No.: 566,019

[22] Filed: Aug. 10, 1990

[30] Foreign Application Priority Data

Aug. 11, 1989 [JP] Japan .................................. 1-208781

[51] Int. Cl.⁵ ............................................. F02B 15/00
[52] U.S. Cl. ..................................... 123/432; 123/308
[58] Field of Search ............................... 123/432, 308

[56] References Cited

U.S. PATENT DOCUMENTS 4,622,940 11/1986 Yoshikawa ........................... 123/432
4,942,857 7/1990 Yoshikawa ........................... 123/308
4,971,008 11/1990 Morishita ............................ 123/432

Primary Examiner—E. Rollins Cross
Attorney, Agent, or Firm—Thompson, Hine and Flory

[57] ABSTRACT

An intake system having first, second and third intake ports connected to first, second and third air intake passages, respectively and up stream ends of three air intake passages are connected to a common air intake passage. The first air intake passage is set to supply air through the first intake port along an inner peripheral surface of the combustion chamber. The second and third air intake passages are set so that axial center lines thereof may intersect an axial center line of the first air intake passage and an intersecting point of the axial center lines of the third and first air intake passages are up stream of the intersection of the axial center lines of the second and first air intake passages. Thus, swirl of intake air in the combustion chamber from the third intake port is stronger than that generated by the intake air from the second intake port. Then, swirl around an ignition plug arranged almost in the center of the combustion chamber is strengthened. In addition, turbulent flow of intake air is generated by using the difference of velocities between the outside swirl and the swirl around the spark plug, resulting in improved combustability. In addition, cooling loss of the cylinder is prevented by relatively reducing the swirl around the outer periphery of the combustion chamber.

9 Claims, 3 Drawing Sheets

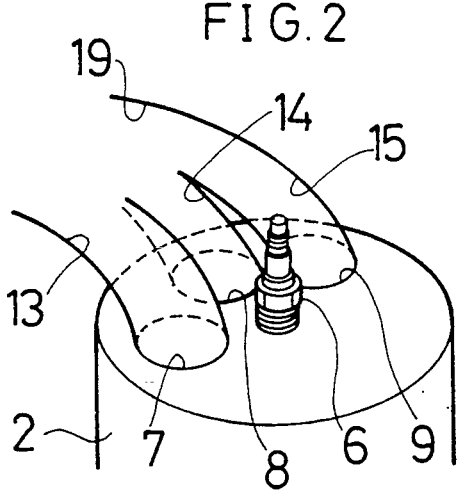
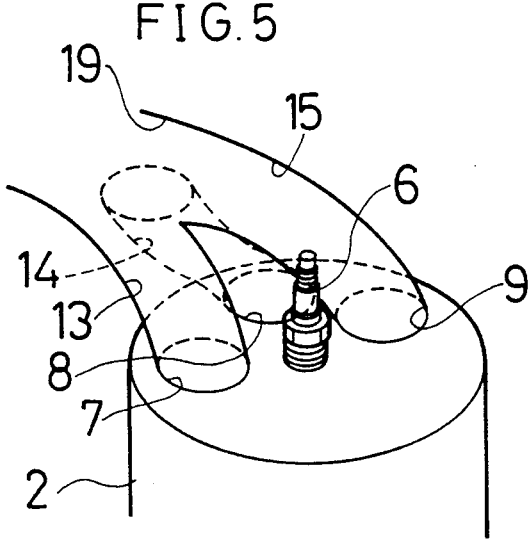
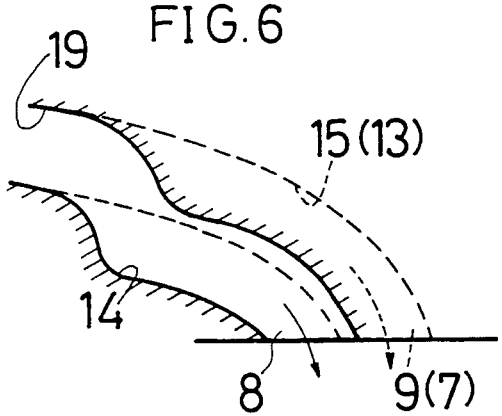
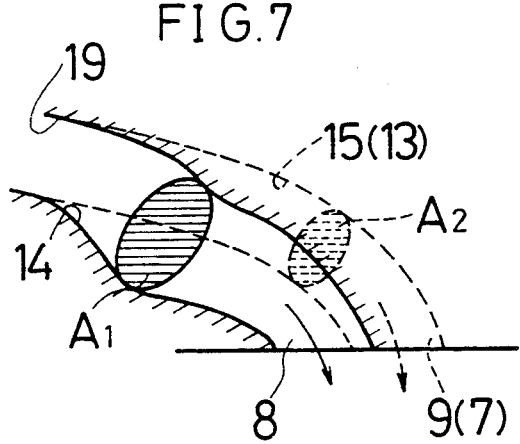

INTAKE SYSTEM FOR MULTIPLE-VALVE ENGINE

BACKGROUND OF THE INVENTION

1. Field of the Invention

The present invention relates to an intake system of a multiple-valve engine comprising a plurality of separate intake passages, which supplies intake air to a combustion chamber through a plurality of intake ports (which are "openings" in the present invention) each opened or closed by an intake valve.

2. Description of the Prior Art

Generally, in an engine having a cylinder in which a combustion chamber is formed at one end in a center line direction, it is known that a plurality of intake ports each opened or closed by an intake valve are opened to the combustion chamber of a cylinder and then intake air is supplied to the combustion chamber through the plurality of intake ports in order to increase intake efficiency of the combustion chamber and increase an engine output without increasing the capacity of the combustion chamber. Such an intake system of a multiple-valve engine comprises a common air intake passage formed corresponding to each cylinder and a plurality of air intake passages branching from a downstream end of the common air intake passage and connected to a plurality of intake ports of each combustion chamber.

According to the above multiple-valve engine, as disclosed in, for example Japanese Utility Model Laid Open Gazette No. 62-93122, when swirl of intake air is generate in order to improve combustibility in each combustion chamber, the downstream part of the common air intake passage corresponding to each cylinder is divided into three air intake passages and then intake air is supplied from each air intake passage into the combustion chamber through each intake port. In addition, it is proposed that control valves are provided on two of three air intake passages, whereby opening and closing operation of those passages are controlled to vary states of the intake air supplied into the combustion chamber through three intake ports.

However, since the plurality of air intake passages through which the intake air is supplied to the combustion chamber are controlled by the control valves in the prior art, the structure of the intake system becomes complicated and manufacture costs are increased. In addition, intake resistance is increased by the control valve and intake efficiency in the combustion chamber is reduced. Especially, when the engine is in a high load state, it is difficult to improve combustibility or anti-knocking function.

SUMMARY OF THE INVENTION

The present invention was made to solve the above problems and it is an object of the present invention to provide an intake system of a multiple-valve engine capable of generating swirl of intake air in a combustion chamber without complicating its structure or increasing intake resistance in an air intake passage when intake air is supplied from each of the air intake passages branching from a common air intake passage to the combustion chamber through an intake port.

According to an intake system of a multiple-valve engine of the present invention, first, second and third intake ports each opened or closed by an intake valve are opened to a combustion chamber formed at an end of a cylinder in an engine in its center line direction and these intake ports are arranged along the periphery of the cylinder, in which the third intake port is arranged between the first and second intake ports.

In addition, a first air intake passage is formed, a downstream end of which is connected to the first intake port to supply intake air into the combustion chamber through the first intake port and the direction of an axial center line of the first air intake passage is set so that intake air supplied to the combustion chamber through the first intake port may flow along an inner peripheral surface of the combustion chamber.

Similarly, a second air intake passage is formed, a downstream end of which is connected to the second intake port to supply intake air into the combustion chamber through the second intake port and an axial center line of the second intake passage intersects the axial center line of the first intake passage at a first intersecting point.

In addition, a third air intake passage is formed, a lower end of which is connected to the third intake port to supply intake air into the combustion chamber through the third intake port and an axial center line of the third intake passage intersects the axial center line of the first air intake passage at a second intersecting point which is upstream of the first intersecting point.

In addition, a common air intake passage connected to the first, second and third air intake passages is formed.

An ignition plug projecting into the combustion chamber is arranged almost in the center of the combustion chamber and ahead of an outlet of the third intake port.

In addition, a fuel injector is arranged so that its fuel injecting direction is directed toward the third intake port.

In addition, the third air intake passage is connected to the central part of the common air intake passage.

Two exhaust ports each opened or closed by an exhaust valve are opened to the combustion chamber of the engine.

At this time, the first, second and third intake ports and two exhaust ports are arranged on a concentric circle about the ignition plug arranged in the center of the combustion chamber.

In addition, a section area of the third air intake passage is larger than that of the first and second air intake passages and an opening area of the third intake port is the same as that of the first and second intake ports.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

BRIEF DESCRIPTION OF THE DRAWINGS

FIGS. 1 to 4 show a first embodiment of the present invention, in which

FIG. 1 is a plan view showing intake ports and air intake passages in an intake system;

FIG. 2 is a schematic perspective view showing the same;

FIG. 3 is a sectional view showing an engine; and

FIG. 4 is a plan view showing how intake air is supplied into a combustion chamber, FIGS. 5 and 6 show a second embodiment of the present invention, in which FIG. 5 is a view corresponding to FIG. 2; and FIG. 6 is a schematic front view showing intake ports and air intake passages in an intake system, and FIG. 7 shows a third embodiment of the present invention, which is a view corresponding to FIG. 6.

DESCRIPTION OF THE PREFERRED EMBODIMENTS

Figure 1:
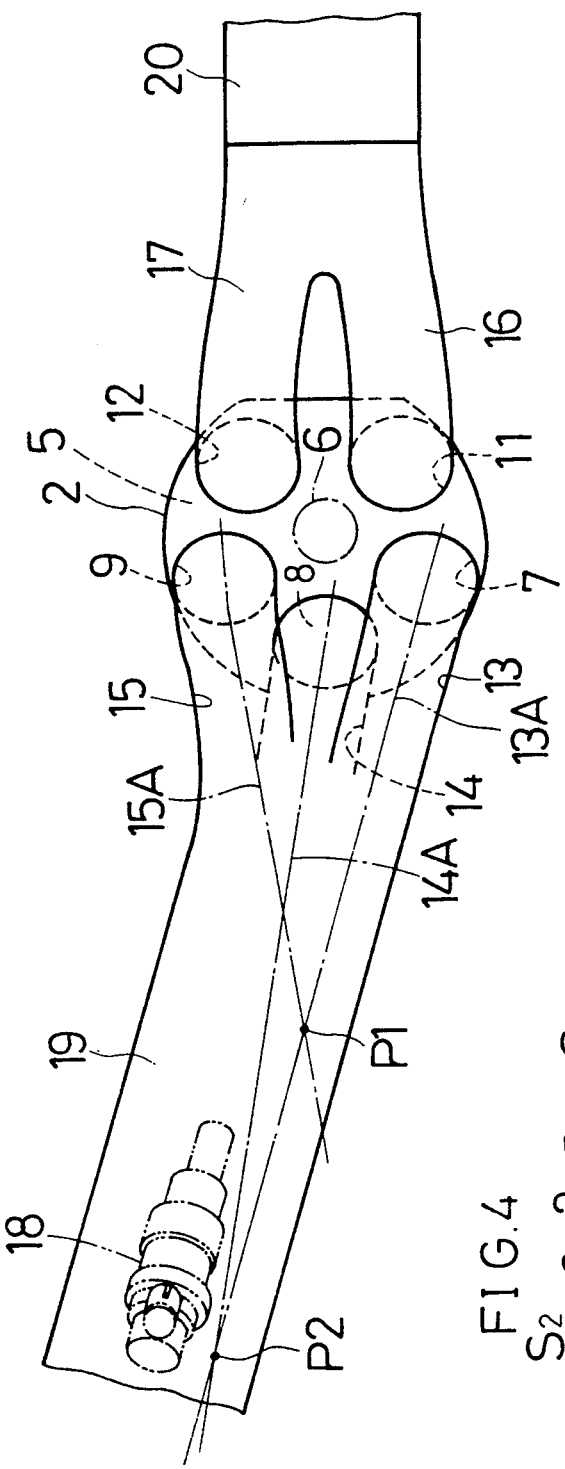

FIGS. 1 to 4 are views each showing an intake system of a multiple-valve engine in accordance with a first embodiment of the present invention.

Referring to FIGS. 1 to 4, a piston 1 is inserted into a cylinder 2 formed in a cylinder block 3 and a cylinder head 4 is attached on the cylinder block 3 through a gasket 3a. A combustion chamber 5 is formed between the cylinder head 4 and an upper part of the cylinder 2. An ignition plug 6 is arranged nearly in the center of the combustion chamber 5 and an end part of the ignition plug 6 projects into the combustion chamber 5. First, second and third intake ports 7, 9 and 8 are opened to a combustion chamber forming part facing to the combustion chamber 5 at a lower part of the cylinder head 4 and these intake ports 7, 9 and 8 are arranged in series along the periphery of the cylinder 2. The third intake port 8 is arranged between the first intake port 7 and the second intake port 9 (the first intake port 7 is not shown in FIG. 3 because the first intake port 7 and the second intake port 9 are arranged at symmetrical positions about the third intake port 8). In addition, a pair of exhaust ports 11 and 12 are opened to the combustion chamber forming part at a position opposed to the intake ports 7 to 9 (the exhaust port 12 is behind the exhaust port 11).

Figure 3:
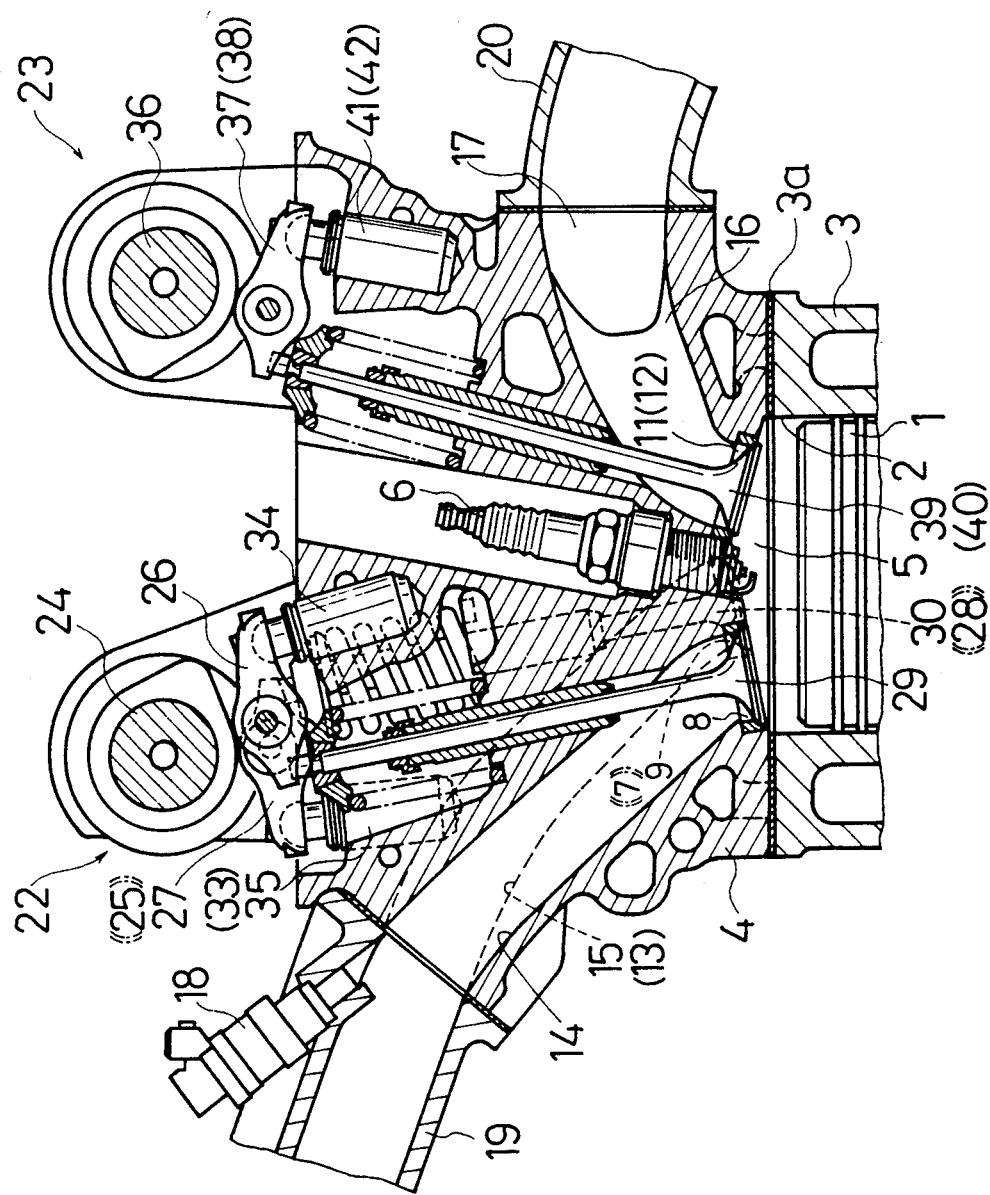

A first air intake passage 13 having a downstream end connected to the first intake port 7, a third air intake passage 14 having a downstream end connected to the third intake port 8 and a second air intake passage 15 having a downstream end connected to the second intake port 9 are formed on the cylinder head 4 (the first air intake passage 13 is not shown in FIG. 3 because the first air intake passage 13 and the second air intake passage 15 are arranged at symmetrical positions about the third air intake passage 14). Each upstream end of the air intake passages 13, 14 and 15 is connected to a common air intake passage 19 in which a fuel injector 18 is arranged so that its fuel injecting direction may be directed toward the third intake port 8 of the downstream end of the third air intake passage 14.

An exhaust passage 16 connected to the exhaust port 11 and an exhaust passage 17 connected to the exhaust port 12 are also formed on the cylinder head 4. Downstream ends of the exhaust passages 16 and 17 are connected to a common exhaust passage 20.

In addition, as shown in FIG. 3, a valve operating mechanism 22 on the intake side and a valve operating mechanism 23 on the exhaust side are attached to the cylinder head 4. The intake side valve operating mechanism 22 comprises a cam shaft 24, an intake valve 28 driven by the cam shaft 24 through a rocker arm 25 to open or close the first intake port 7, an intake valve 29 driven by the cam shaft 24 through a rocker arm 26 to open or close the third intake port 8 and an intake valve 30 driven by the cam shaft 24 through a rocker arm 27 to open or close the second intake port 9. Hydraulic lash adjusters 33, 34 and 35 are in contact with the rocker arms 25, 26 and 27, respectively. In addition, the intake valves 28, 29 and 30 are forced so as to close the intake ports 7, 8 and 9 through a spring, respectively (the rocker arm 25, the intake valve 28 and the hydraulic lash adjuster 33 are not shown in FIG. 3 because they overlap with the rocker arm 27, the intake valve 30 and the hydraulic lash adjuster 35, respectively).

Meanwhile, the exhaust side valve operating mechanism 23 comprises a cam shaft 36, an exhaust valve 39 driven by the cam shaft 36 through a rocker arm 37 to open or close the exhaust port 11 and an exhaust valve 40 driven by the cam shaft 36 through a rocker arm 38 to open or close the exhaust port 12. Hydraulic lash adjusters 41 and 42 are in contact with the rocker arms 37 and 38, respectively. In addition, the exhaust valves 39 and 40 are forced so as to close the exhaust ports 11 and 12 through a spring, respectively (the rocker arm 38, the exhaust valve 40 and the hydraulic lash adjuster 42 are behind the rocker arm 37, the exhaust valve 39 and the hydraulic lash adjuster 41, respectively in FIG. 3).

FIGS. 1 and 2 show arranged position of the intake ports 7 to 9 and exhaust ports 11 and 12, positions and directions of the air intake passages 13 to 15 connected to the common air intake passage 19 and positions and directions of the exhaust passages 16 and 17 connected to the common exhaust passage 20 in the thus constructed intake system of a multiple-valve engine.

As shown in FIG. 1, an axial center line 13A of the first air intake passage 13 having the downstream end connected to the first intake port 7 is set so that the intake air supplied into the combustion chamber 5 through the intake port 7 may flow along an inner peripheral surface of the combustion chamber 5.

Meanwhile, an axial center line 14A of the third air intake passage 14 having the downstream end connected to the third intake port 8 intersects the axial center line 13A of the first air intake passage 13 at a second intersecting point P2. Therefore, the intake air supplied into the combustion chamber 5 from the intake port 8 is sent toward the ignition plug 6 arranged almost in the center of the combustion chamber 5.

In addition, an axial center line 15A of the second air intake passage 15 having the downstream end connected to the second intake port 9 intersects the axial center line 13A of the first air intake passage 13 at a first intersecting point P1 which is downstream of the intersecting point P2.

More specifically, the third air intake passage 14 is arranged between the first and second air intake passages 13 and 15 and its upstream end is connected to the center of the common air intake passage 19, to which air intake passages 13 and 15 are also connected. In other words, the common air intake passage 19 branches into the first, second and third air intake passages 13, 15 and 14 from the same position of the downstream end thereof.

Exhaust gas generated in the combustion chamber 5 is exhausted from the exhaust ports 11 and 12 to the exhaust passage 20.

Figure 4:
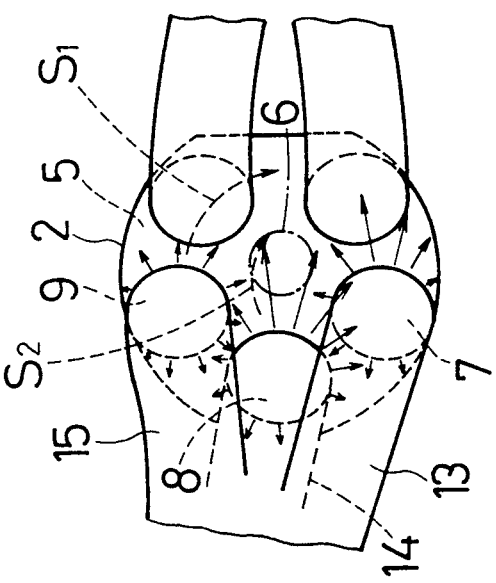

As described above, according to this embodiment of the present invention the intake air supplied through the first intake port 7 flows along the inner peripheral surface of the combustion chamber 5 with relatively high flow velocity as shown by an arrow in FIG. 4. On the other hand, the intake air supplied into the combustion chamber 5 through the second intake port 9 has relatively low flow velocity.

In addition, since the third air intake passage 14 is arranged between the first and second air intake passages 13 and 15 and its upper stream end is connected to the center of the common air intake passage 19 where velocity gradient of intake air is largest, intake air having high flow velocity in the center of the common air intake passage 19, which is not influenced by intake air resistance caused by a wall surface, is introduced into the third air intake passage 14. Thus, the intake air from the third intake port 8 is introduced into almost the center of the combustion chamber 5 with flow velocity higher than that of the intake air introduced from the first intake port 7. As a result, as for swirl generated in the combustion chamber 5, swirl $S_2$ generated by flow of the intake air from the third intake port 8 is larger than swirl $S_1$ generated by flow of the intake air from the second intake port 9. Turbulent flow of the intake air is generated in the vicinity of the ignition plug 6 projecting into the center of the combustion chamber 5 by the difference between the swirl $S_1$ and the swirl $S_2$. In addition, the swirl around the ignition plug 6 becomes strong because the intake air from the intake port 8 has high flow velocity and then that part is scavenged, whereby combustibility in the combustion chamber 5 can be improved.

Since the swirl $S_1$ flowing along the inner peripheral surface of the combustion chamber 5 is smaller than the swirl $S_2$ flowing in the center part, cooling loss of the intake air in the cylinder 2 or the combustion chamber forming part can be reduced.

FIGS. 5 and 6 show a second embodiment of the present invention. According to the second embodiment, the third air intake passage 14 is arranged under the first and second air intake passages 13 and 15 and its upper stream end is connected to the center of the common air intake passage 19. That connecting part is on a little upper stream of the connecting part between the common air intake passage 19 and the air intake passages 13 and 15. Meanwhile, the first to third air intake passages 13, 15 and 14 have the same section area.

Therefore, the same effect as in the first embodiment of the present invention is attained in this second embodiment of the present invention.

FIG. 7 shows a third embodiment of the present invention. A structure in accordance with this embodiment is basically the same as that of the second embodiment of the present invention. This embodiment is different from the second embodiment in that a section area $A_1$ of the third air intake passage 14 is larger than a section area $A_2$ of the first and second air intake passages 13 and 15. Meanwhile, an opening area of the third intake port 8 is the same as that of the first and second intake ports 7 and 9.

Therefore, according to the third embodiment of the present invention, the intake air in the common air intake passage 19 flows into the third air intake passage 14 having a large section area with priority to the first and second air intake passages 13 and 15, so that an amount of the intake air flowing into the third air intake passage 14 is increased. However, since the opening area of the third intake port 8 at a downstream end of the third air intake passage 14 is the same as that of the intake ports 7 and 9, the intake air in the third air intake passage 14 is throttled when it passes through the third intake port 8, with the result that flow velocity thereof is increased. Thus, the intake air is introduced into the combustion chamber 5 from the third intake port 8 at high speed, with the result that the swirl $S_2$ around the ignition plug 6 is further increased.

What is claimed is:

1. An intake system of a multiple-valve engine having first, second and third intake ports each opened or closed by an intake valve, which are opened to a combustion chamber formed at one end of a cylinder in an engine along its center line and arranged along the periphery of the cylinder, in which the third intake port is arranged between the first and second intake ports, said intake system comprising:

a first air intake passage having a downstream end connected to said first intake port to supply intake air into the combustion chamber through said first intake port, whose axial center line is set so that the intake air supplied into the combustion chamber through said first intake port may flow along an inner peripheral surface of the combustion chamber;

a second air intake passage having a downstream end connected to said second intake port to supply intake air into the combustion chamber through said second intake port, whose axial center line intersects the axial center line of said first air intake passage at a first intersecting point;

a third air intake passage having a downstream end connected to said third intake port to supply intake air into the combustion chamber through said third intake port, whose axial center line intersects the axial center line of said first air intake passage at a second intersecting point which is upstream of said first intersecting point; and a common air intake passage connected to the upstream ends of said first, second and third air intake passages.

2. An intake system of a multiple-valve engine in accordance with claim 1, wherein an ignition plug is arranged almost in the center of the combustion chamber.

3. An intake system of a multiple-valve engine in accordance with claim 1, wherein a fuel injector is arranged so that its fuel injecting direction is directed toward said third intake port.

4. An intake system of a multiple-valve engine in accordance with claim 1, wherein an ignition plug is arranged ahead of an outlet of said third intake port.

5. An intake system of a multiple-valve engine in accordance with claim 1, wherein said third air intake passage is connected to the center of the common air intake passage.

6. An intake system of a multiple-valve engine in accordance with claim 1, wherein two exhaust ports each opened or closed by an exhaust valve are opened to the combustion chamber of the engine.

7. An intake system of a multiple-valve engine in accordance with claim 6, wherein said first, second and third intake ports and two exhaust ports are arranged on a concentric circle about the ignition plug arranged in the center of the combustion chamber.

8. An intake system of a multiple-valve engine in accordance with claim 4, wherein said ignition plug is arranged almost in the center of the combustion chamber.

9. An intake system of a multiple-valve engine in accordance with claim 5, wherein a section area of the third air intake passage is larger than that of the first and second air intake passages and an opening area of the third intake port is the same as that of the first and second intake ports.

* * * * *